(12) United States Patent
Bontu et al.

(10) Patent No.: US 10,154,467 B2
(45) Date of Patent: Dec. 11, 2018

(54) TRANSMIT POWER ADJUSTMENT FOR INTER-DEVICE COMMUNICATION IN WIRELESS COMMUNICATION SYSTEMS

(71) Applicants: Chandra Sekhar Bontu, Kanata (CA); Yi Song, Irving, TX (US); Zhijun Cai, Irving, TX (US)

(72) Inventors: Chandra Sekhar Bontu, Kanata (CA); Yi Song, Irving, TX (US); Zhijun Cai, Irving, TX (US)

(73) Assignee: BlackBerry Limited, Waterloo, Ontario (CA)

(*) Notice: Subject to any disclaimer, the term of this patent is extended or adjusted under 35 U.S.C. 154(b) by 312 days.

(21) Appl. No.: 13/627,647

(22) Filed: Sep. 26, 2012

(65) Prior Publication Data

US 2014/0086157 A1    Mar. 27, 2014

(51) Int. Cl.
  *H04W 52/38* (2009.01)
  *H04W 52/08* (2009.01)

(52) U.S. Cl.
  CPC .......... *H04W 52/383* (2013.01); *H04W 52/08* (2013.01)

(58) Field of Classification Search
  CPC ..... H04W 52/34; H04W 52/38; H04W 76/02; H04W 52/04; H04W 52/08; H04W 72/04; H04W 52/383
  See application file for complete search history.

(56) References Cited

U.S. PATENT DOCUMENTS

| | | |
|---|---|---|
| 6,925,286 B1 | 8/2005 | Kraiem |
| 7,969,968 B2 | 6/2011 | De Luca et al. |
| 8,504,052 B2 * | 8/2013 | Hakola ................. H04W 24/10 455/452.1 |
| 8,515,500 B2 | 8/2013 | Das et al. |
| 8,582,593 B2 | 11/2013 | Chen et al. |

(Continued)

FOREIGN PATENT DOCUMENTS

| | | |
|---|---|---|
| CN | 1331868 | 1/2002 |
| CN | 101617548 | 12/2009 |

(Continued)

OTHER PUBLICATIONS

International Search Report for Application No. PCT/US20/026372, dated Apr. 24, 2013, 13 pages.

(Continued)

*Primary Examiner* — Ian N Moore
*Assistant Examiner* — Latresa McCallum
(74) *Attorney, Agent, or Firm* — Fish & Richardson P.C.

(57) ABSTRACT

Systems and methods for user equipment (UE) transmit power adjustment for inter-device communication in wireless communication systems are provided. A UE may communicate directly with another UE over a direct inter-device communication link when they are located in proximity. The UE may adjust its transmit power for the inter-device communication during a device handshake/discovery procedure. For example, the UE may adjust its transmit power for the inter-device communication based on a data exchange between the UE and the other UE over the inter-device communication link. Long term evolution (LTE) downlink or uplink radio resources may be used for the data exchange over the inter-device communication link.

22 Claims, 5 Drawing Sheets

(56) References Cited

U.S. PATENT DOCUMENTS

| | | | |
|---|---|---|---|
| 8,631,466 B2 | 1/2014 | Cha et al. | |
| 8,649,809 B2 | 2/2014 | Rbke et al. | |
| 9,521,683 B2 | 12/2016 | Van Phan et al. | |
| 2002/0111144 A1* | 8/2002 | Schiff | 455/69 |
| 2004/0202295 A1 | 10/2004 | Shen et al. | |
| 2004/0209634 A1 | 10/2004 | Hrastar | |
| 2005/0026597 A1 | 2/2005 | Kim et al. | |
| 2005/0111383 A1 | 5/2005 | Grob et al. | |
| 2005/0239451 A1 | 10/2005 | Periyalwar et al. | |
| 2006/0075263 A1 | 4/2006 | Taylor | |
| 2006/0190470 A1 | 8/2006 | Lemnotis | |
| 2007/0129076 A1 | 6/2007 | Cho et al. | |
| 2008/0002658 A1 | 1/2008 | Soliman | |
| 2008/0069063 A1 | 3/2008 | Li et al. | |
| 2009/0075630 A1 | 3/2009 | Mclean | |
| 2009/0119776 A1 | 5/2009 | Palnitkar et al. | |
| 2009/0130984 A1 | 5/2009 | Lee et al. | |
| 2010/0009675 A1 | 1/2010 | Wijting et al. | |
| 2010/0095123 A1 | 4/2010 | He | |
| 2010/0240312 A1 | 9/2010 | Pend et al. | |
| 2010/0279672 A1 | 11/2010 | Koskela et al. | |
| 2011/0081908 A1 | 4/2011 | Michaelis et al. | |
| 2011/0106952 A1 | 5/2011 | Doppler et al. | |
| 2011/0143771 A1 | 6/2011 | Edge et al. | |
| 2011/0145421 A1 | 6/2011 | Yao et al. | |
| 2011/0147462 A1 | 6/2011 | Speich | |
| 2011/0159799 A1 | 6/2011 | Chen et al. | |
| 2011/0194530 A1 | 8/2011 | Tinnakornsrisuphap et al. | |
| 2011/0216739 A1 | 9/2011 | Lee et al. | |
| 2011/0258313 A1 | 10/2011 | Mallik et al. | |
| 2011/0268004 A1 | 11/2011 | Doppler et al. | |
| 2011/0275382 A1* | 11/2011 | Hakola et al. | 455/452.2 |
| 2011/0294474 A1 | 12/2011 | Barany et al. | |
| 2011/0317569 A1 | 12/2011 | Kneckt et al. | |
| 2012/0026971 A1 | 2/2012 | Khandelia et al. | |
| 2012/0044865 A1 | 2/2012 | Singh | |
| 2012/0051315 A1 | 3/2012 | Wang et al. | |
| 2012/0093070 A1 | 4/2012 | Huang | |
| 2012/0115518 A1* | 5/2012 | Zeira | H04W 8/005 455/500 |
| 2012/0129540 A1* | 5/2012 | Hakola | H04W 72/042 455/450 |
| 2012/0163235 A1 | 6/2012 | Ho et al. | |
| 2012/0163252 A1 | 6/2012 | Ahn et al. | |
| 2012/0179789 A1 | 7/2012 | Griot et al. | |
| 2012/0240216 A1 | 9/2012 | Gutierrez | |
| 2013/0003629 A1 | 1/2013 | Jeong et al. | |
| 2013/0028235 A1 | 1/2013 | Barrett et al. | |
| 2013/0083719 A1 | 4/2013 | Seo | |
| 2013/0159522 A1 | 6/2013 | Hakola et al. | |
| 2013/0160101 A1 | 6/2013 | Hakola et al. | |
| 2013/0244585 A1 | 9/2013 | Chen | |
| 2013/0315196 A1 | 11/2013 | Lim et al. | |
| 2013/0329689 A1 | 12/2013 | Choi et al. | |
| 2014/0004796 A1 | 1/2014 | Cakulev et al. | |
| 2014/0010175 A1 | 1/2014 | Chiu | |
| 2014/0018010 A1* | 1/2014 | Gao | H04W 76/023 455/67.13 |
| 2014/0022986 A1 | 1/2014 | Wu | |
| 2014/0078952 A1 | 3/2014 | Bontu et al. | |
| 2014/0078971 A1 | 3/2014 | Bontu et al. | |
| 2014/0086152 A1 | 3/2014 | Bontu et al. | |
| 2014/0086153 A1 | 3/2014 | Bontu et al. | |
| 2014/0106707 A1 | 4/2014 | Bontu et al. | |
| 2014/0122607 A1 | 5/2014 | Fodor et al. | |
| 2014/0140296 A1 | 5/2014 | Choi et al. | |
| 2014/0153390 A1 | 6/2014 | Ishii et al. | |
| 2014/0342738 A1 | 11/2014 | Ishii et al. | |
| 2015/0036495 A1 | 2/2015 | Venkatachalam | |
| 2015/0131475 A1 | 5/2015 | Van Phan | |

FOREIGN PATENT DOCUMENTS

| | | |
|---|---|---|
| CN | 102098796 | 6/2011 |
| CN | 102217411 | 10/2011 |
| CN | 102340829 | 2/2012 |
| CN | 102550117 | 7/2012 |
| CN | 102647246 | 8/2012 |
| CN | 102668493 | 9/2012 |
| CN | 102696267 | 9/2012 |
| EP | 1063785 | 12/2000 |
| EP | 2665299 | 11/2013 |
| JP | 2001044932 | 2/2001 |
| KR | 20120074251 | 7/2012 |
| WO | 2000/27045 A1 | 5/2000 |
| WO | 2009/138820 | 11/2009 |
| WO | 2010/007498 | 1/2010 |
| WO | 2010/059856 | 5/2010 |
| WO | 2011/036507 | 3/2011 |
| WO | 2011050519 | 5/2011 |
| WO | 2011/147462 | 12/2011 |
| WO | 2012/052911 | 4/2012 |
| WO | 2012060934 | 5/2012 |
| WO | 2012/088470 | 6/2012 |
| WO | 2012097075 | 7/2012 |

OTHER PUBLICATIONS

"3rd Generation Partnership Project; Technical Specification Group Radio Access Network; Evolved Universal Terrestrial Radio Access (E-UTRA); Radio Resoorce Control (RCC); Protocol Specification (Release 11)," V11.1.0, Sep. 2012 (Sep. 24, 2012), 325 pages.

3GPP TS 36.300 V10.5.0 (Sep. 2011) Technical Specification: Evolved Universal Terrestrial Radio Access (E-UTRA) and Evolved Universal Terrestrial Radio Access Network (E-UTRAN); Overall description; Stage 2 (Release 10).

3GPP TS 36.211 V10.3.0 (Sep. 2011) Technical Specification: Evolved Universal Terrestrial Radio Access (E-UTRA); Physical Channels and Modulation (Release 10).

3GPP TS 36.212 V10.1.0 (Mar. 2011) Technical Specification: Evolved Universal Terrestrial Radio Access (E-UTRA); Multiplexing and channel coding (Release 10).

3GPP TS 36.213 V10.1.0 (Mar. 2011) Technical Specification: Evolved Universal Terrestrial Radio Access (E-UTRA); Physical layer procedures (Release 10).

3GPP TS 36.331 V10.1.0 (Mar. 2011) Technical Specification: Evolved Universal Terrestrial Radio Access (E-UTRA); Radio Resource Control (RRC); Protocol specification (Release 10).

Fodor et al., "Design Aspects of Network Assisted Device-to-Device Communications" IEEE Communications Magazine, IEEE Service Center, Piscataway, US, vol. 50, No. 3, Mar. 1, 2012 (Mar. 1, 2012), pp. 170-177; 8 pages.

"Lei Lei et al: ""Operator controlled device-to-device communications in LTE-advanced networks"", IEEE Wireless Communications, IEEE Service Center, Piscataway, NJ, US, vol. 19, No. 3, Jun. 2012; 9 pages.".

Intel: "Pro se Use Case for Unidirectional D2D Communication", A 3GPP Draft; S1-120065; 3GPP TSG-SA WG1, Meeting #57; Kyoto, Japan; Feb. 2012; 3 pages.

Office Action issued in U.S. Appl. No. 13/621,703 dated Nov. 19, 2014.

Office Action issued in U.S. Appl. No. 13/624,736 dated Aug. 27, 2014; 14 pages.

International Search Report for Application No. PCT/US2013/026157, dated Jul. 30, 2013, 24 pages.

International Search Report for Application No. PCT/US2013/026174, dated Jul. 17, 2013, 5 pages.

International Search Report for Application No. PCT/US2013/026104, dated Jun. 24, 2013, 3 pages.

International Search Report for Application No. PCT/US2013/026356, dated Jun. 19, 2013, 3 pages.

International Search Report for Application No. PCT/US2013/026382, dated Jul. 11, 2013, 5 pages.

Search Report issued in TW Application No. 102132479 dated Nov. 7, 2014, 1 page.

(56) References Cited

OTHER PUBLICATIONS

"Intel: ""Operator Managed and Operator Assisted D2D""", 3GPP Draft; S1-120063; 3GPP TSG-SA WG1; Meeting #57, Kyoto, Japan; Feb. 2012 ; 4 pages.".
Office Action and Search Report issued in TW Application No. 102132483 dated Dec. 25, 2014; 8 pages.
Office Action issued in U.S. Appl. No. 13/652,011 dated Jan. 23, 2015.
Office Action and Search Report issued in Taiwanese Application No. 102132482 dated Dec. 26, 2014; 9 pages.
Office Action and Search Report issued in Taiwanese Application No. 102132487 dated Dec. 26, 2014; 12 pages.
Taiwanese Office Action and Search Report in Taiwanese Application No. 102132478, dated Jan. 22, 2015, 11 pages.
International Preliminary Report on Patentability in International Application No. PCT/US2013/026157, dated Apr. 2, 2015, 17 pages.
International Preliminary Report on Patentability in International Application No. PCT/US2013/026382, dated Apr. 2, 2015, 10 pages.
International Preliminary Report on Patentability in International Application No. PCT/US2013/026372, dated Mar. 31, 2015, 8 pages.
International Preliminary Report on Patentability in International Application No. PCT/US2013/026356, dated Apr. 30, 2013, 7 pages.
International Preliminary Report on Patentability in International Application No. PCT/US2013/026174, dated Apr. 2, 2015, 13 pages.
Advisory Action issued in U.S. Appl. No. 13/622,137 dated Jul. 26, 2017, 4 pages.
Office Action issued in Korean Application No. 10-2015-7012597 dated Mar. 18, 2016, 19 pages.
Office Action issued in Korean Application No. 10-2015-7010012 dated Apr. 19, 2016, 13 pages.
Office Action issued in Korean Application No. 10-2015-7010443 dated May 27, 2016, 10 pages.
Office Action issued in Korean Application No. 10-2015-7010012 dated Sep. 6, 2016, 4 pages.
Office Action issued in Korean Application No. 10-2015-7010443 dated Nov. 25, 2016, 11 pages.
Office Action issued in Chinese Application No. 201380060975.7 dated May 5, 2016, 8 pages.
Office Action issued in Chinese Application No. 201380060975.7 dated Dec. 5, 2016, 18 pages.
Office Action issued in Chinese Application No. 201380060975.7 dated May 4, 2017, 19 pages.
Office Action issued in Chinese Application No. 201380060975.7 dated Oct. 11, 2017, 21 pages.
Office Action issued in Chinese Application No. 201380061529.8 dated Nov. 16, 2017; 6 pages, 26 pages.
Office Action issued in Chinese Application No. 201380053808.X dated Nov. 16, 2017; 9 pages, 19 pages.
Office Action issued in Chinese Application No. 201380060173.6 dated Nov. 23, 2017; 23 pages.
Office Action issued in Chinese Application No. 201380058840.7 dated Nov. 27, 2017; 7 pages, 14 pages.
Communication Pursuant to Article 94(3) EPC issued in European Application No. 13707754.1 dated Apr. 11, 2016, 5 pages.
Communication Pursuant to Article 94(3) EPC issued in European Application No. 13707748.3 dated Oct. 18, 2016, 6 pages.
Communication Pursuant to Article 94(3) EPC issued in European Application No. 13707748.3 dated Feb. 8, 2017, 7 pages.
Communication Pursuant to Article 94(3) EPC issued in European Application No. 13707753.3 dated Nov. 20, 2017; 3 pages.
Communication Pursuant to Article 94(3) EPC issued in European Application No. 13707748.3 dated Jan. 12, 2018, 9 pages.
Office Action issued in Chinese Application No. 201380060975.7 dated Apr. 4, 2018, 13 pages.
Office Action issued in Chinese Application No. 201380061529.8 dated Apr. 27, 2018, 2 pages.
Office Action issued in Chinese Application No. 201380060975.5 dated Sep. 5, 2018, 6 pages.

\* cited by examiner

TRANSMIT POWER ADJUSTMENT FOR INTER-DEVICE COMMUNICATION IN WIRELESS COMMUNICATION SYSTEMS

TECHNICAL FIELD

The present disclosure generally relates to communications in wireless communication systems, and more particularly, to transmit power adjustment for inter-device communications in wireless communication systems.

BACKGROUND

In wireless networks such as Long Term Evolution (LTE) and LTE-Advanced communication networks, a user equipment (UE) may communicate with other UEs via a base station and an evolved packet core (EPC) network. For example, a UE may send data packets to its serving base station on an uplink. The serving base station may forward the data packets to the EPC network and the EPC network may forward the data packet to another base station or to the same base station that is serving another UE. Data transfer between the UEs is routed through the base station and the EPC. The communication between the UEs is controlled by the policies set by the operator administering the network.

The UEs may communicate directly with each other using other radio access technology (RAT), such as, wireless local area network (WLAN) or Bluetooth when the UEs are located in close proximity and have access to the other RAT. However, this multi-RAT communication requires the availability of the other RAT and the capability of the UEs to operate in the other RAT. Moreover, handover from cellular technology to other RATs may result in service interruption and dropped calls.

BRIEF DESCRIPTION OF THE DRAWINGS

The accompanying drawings, which are incorporated in and constitute part of this specification, and together with the description, illustrate and serve to explain various examples.

DETAILED DESCRIPTION

The present disclosure is directed to systems, methods, and apparatuses for inter-device communication in cellular wireless communication systems. In the current cellular communication system, data transfer between UEs has to be routed through a base station and a core network. When UEs located in close proximity communicate with each other, it would be advantageous for the UEs to communicate via a direct inter-device communication link between them, instead of transferring the data via a network. By providing a direct inter-device communication link between the UEs, improved overall spectral efficiency may be achieved. Moreover, the direct link between the UEs requires lower transmit power at the UE compared to transmitting to the base station, thereby resulting in battery savings at the UEs. Additionally, communicating over the direct link between the UEs may improve quality of service (QoS).

Although the UE may be able to communicate over a direct communication link using another RAT, such as, WLAN, Bluetooth, etc., it requires availability of the services of the other RAT and also requires implementation of the other RAT at the UE. Furthermore, service interruptions and dropped calls may result from switching or handover between different RATs. Therefore, it may be advantageous to enable communications over the inter-device communication link using the same cellular radio access technology and operating in the same radio band.

Reference will now be made in detail to example approaches implemented according to the disclosure; the examples are illustrated in the accompanying drawings. Wherever possible, the same reference numbers will be used throughout the drawings to refer to the same or like parts.

Figure 1:
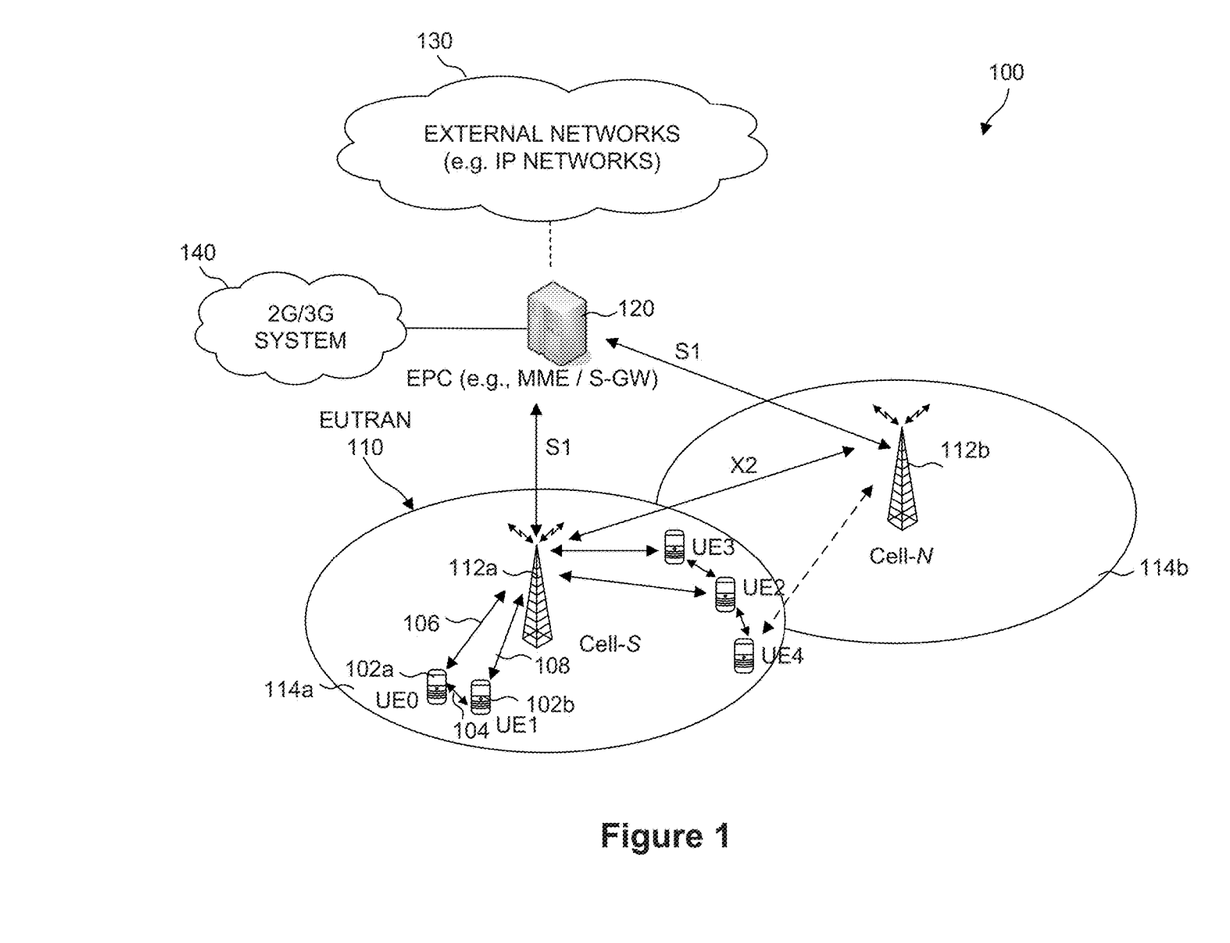
FIG. 1 illustrates an example cellular wireless communication system in which methods and systems consistent with the present disclosure may be implemented.

FIG. 1 illustrates an example cellular wireless communication system 100 in which systems and methods consistent with this disclosure may be implemented. The cellular network system 100 shown in FIG. 1 includes one or more base stations (i.e., 112a and 112b). In the LTE example of FIG. 1, the base stations are shown as evolved Node Bs (eNBs) 112a and 112b, although base stations operate in any wireless communications system, including for example, macro cell, femto cell, relay cell, and pico cell. Base stations are nodes that can relay signals for mobile devices, also referred to herein as user equipment, or for other base stations. The base stations are also referred to as access node devices. The example LTE telecommunications environment 100 of FIG. 1 includes one or more radio access networks 110, core networks (CNs) 120, and external networks 130. In certain implementations, the radio access networks may be Evolved Universal Terrestrial Radio Access Networks (EUTRANs). In addition, core networks 120 may be evolved packet cores (EPCs). Further, as shown, one or more mobile electronic devices 102a, 102b operate within the LTE system 100. In some implementations, 2G/3G systems 140, e.g., Global System for Mobile communication (GSM), Interim Standard 95 (IS-95), Universal Mobile Telecommunications System (UMTS) and Code Division Multiple Access (CDMA2000) may also be integrated into the LTE telecommunication system 100.

In the example LTE system shown in FIG. 1, the EUTRAN 110 includes eNB 112a and eNB 112b. Cell 114a is the service area of eNB 112a and Cell 114b is the service area of eNB 112b. User equipment (UEs) 102a and 102b operate in Cell 114a and are served by eNB 112a. The EUTRAN 110 can include one or more eNBs (e.g., eNB 112a and eNB 112b) and one or more UEs (e.g., UE 102a and UE 102b) can operate in a cell. The eNBs 112a and 112b communicate directly to the UEs 102a and 102b. In some implementations, the eNB 112a or 112b may be in a one-to-many relationship with the UEs 102a and 102b, e.g., eNB 112a in the example LTE system 100 can serve multiple UEs (i.e., UE 102a and UE 102b) within its coverage area Cell 114a, but each of UE 102a and UE 102b may be connected to one serving eNB 112a at a time. In some implementations, the eNBs 112a and 112b may be in a many-to-many relationship with the UEs, e.g., UE 102a and UE 102b can be connected to eNB 112a and eNB 112b. The eNB 112a may be connected to eNB 112b such that handover may be conducted if one or both of the UEs 102a and 102b travels, e.g., from cell 114a to cell 114b. The UEs 102a and 102b may be any wireless electronic device used by an end-user to communicate, for example, within the LTE system 100.

The UEs 102a and 102b may transmit voice, video, multimedia, text, web content and/or any other user/client-specific content. The transmission of some content, e.g., video and web content, may require high channel throughput to satisfy the end-user demand. In some instances, however, the channel between UEs 102a, 102b and eNBs 112a, 112b may be contaminated by multipath fading due to the multiple signal paths arising from many reflections in the wireless environment. Accordingly, the UEs' transmission may adapt to the wireless environment. In short, the UEs 102a and 102b may generate requests, send responses or otherwise communicate in different means with Evolved Packet Core (EPC) 120 and/or Internet Protocol (IP) networks 130 through one or more eNBs 112a and 112b.

In some implementations, the UEs 102a and 102b may communicate over an inter-device communication link when they are located in close proximity to one another, without routing the data through the eNB 112a. The boundary of the distance of the inter-device communication link may be limited by the transmission power of the UEs. In one example, close proximity could be a few meters. In another example, close proximity could be tens of meters. It is also possible that in certain circumstances, the close proximity may mean larger distance such as hundreds of meters. For example, the UEs 102a and 102b may communicate directly over the inter-device communication link 104, instead of communicating with each other through their links with the eNB 112a, i.e., 106 and 108 respectively. The inter-device communication link may also be referred to as a device-to-device (D2D) communication link. The UEs 102a and 102b may simultaneously maintain an active communication link with the eNB 112a such that the UEs 102a and 102b may still receive messages from the eNB or other UEs, when communicating with each other over the direct inter-device link.

Examples of UEs include, but are not limited to, a mobile phone, a smart phone, a telephone, a television, a remote controller, a set-top box, a computer monitor, a computer (including a tablet computer such as a BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, a game device, etc. The UE 102a or 102b may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 102a or 102b may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

A radio access network is part of a mobile telecommunication system which implements a radio access technology, such as Universal Mobile Telecommunications System (UMTS), CDMA2000 and 3rd Generation Partnership Project (3GPP) LTE. In many applications, the Radio Access Network (RAN) included in an LTE telecommunications system 100 is called an EUTRAN 110. The EUTRAN 110 can be located between the UEs 102a, 102b and EPC 120. The EUTRAN 110 includes at least one eNB 112a or 112b. The eNB can be a radio base station that may control all, or at least some, radio related functions in a fixed part of the system. One or more of eNB 112a or 112b can provide radio interface within their coverage area or a cell for the UEs 102a, 102b to communicate. The eNBs 112a and 112b may be distributed throughout the cellular network to provide a wide area of coverage. The eNBs 112a and 112b may directly communicate with one or more UEs 102a, 102b, other eNBs, and the EPC 120.

The eNBs 112a and 112b may be the end point of the radio protocols towards the UEs 102a, 102b and may relay signals between the radio connection and the connectivity towards the EPC 120. The communication interface between the eNB and the EPC is often referred to as an S1 interface. In certain implementations, EPC 120 is a central component of a core network (CN). The CN can be a backbone network, which may be a central part of the telecommunications system. The EPC 120 can include a mobility management entity (MME), a serving gateway (S-GW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The S-GW functions may include user plane tunnel management and switching. The PGW may provide connectivity to the services domain comprising external networks 130, such as the IP networks. The UEs 102a, 102b, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different locations in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 WLAN, IEEE 802.16 WiMAX network, etc.

Figure 2:
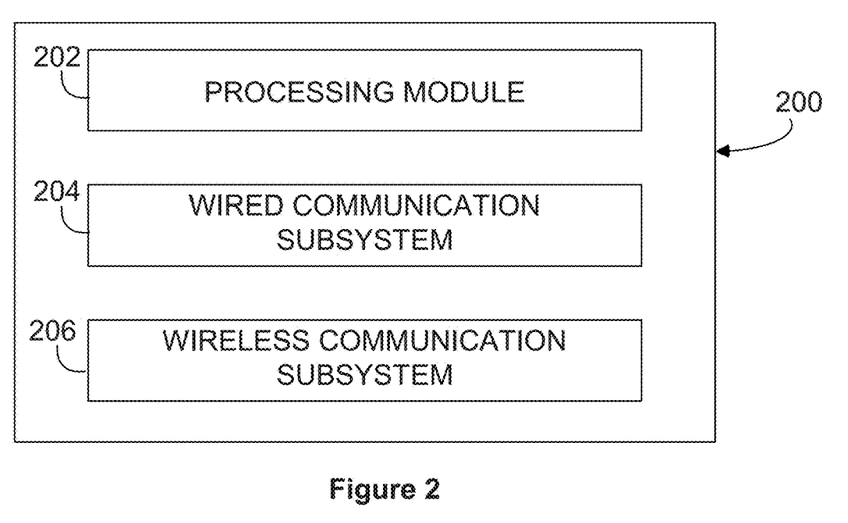
FIG. 2 illustrates an example access node device, in accordance with an example of the present disclosure.

FIG. 2 illustrates an example access node device 200 consistent with certain aspects of this disclosure. The access node device 200 includes a processing module 202, a wired communication subsystem 204, and a wireless communication subsystem 206. The processing module 202 can include one or more processing components (alternatively referred to as "processors" or "central processing units" (CPUs)) operable to execute instructions associated with managing IDC interference. The processing module 202 can also include other auxiliary components, such as random access memory (RAM), read only memory (ROM), secondary storage (for example, a hard disk drive or flash memory). Additionally, the processing module 202 can execute certain instructions and commands to provide wireless or wired communication, using the wired communication subsystem 204 or a wireless communication subsystem 206. One skilled in the art will readily appreciate that various other components can also be included in the example access node device 200 without departing from the principles of the present disclosure.

Figure 3:
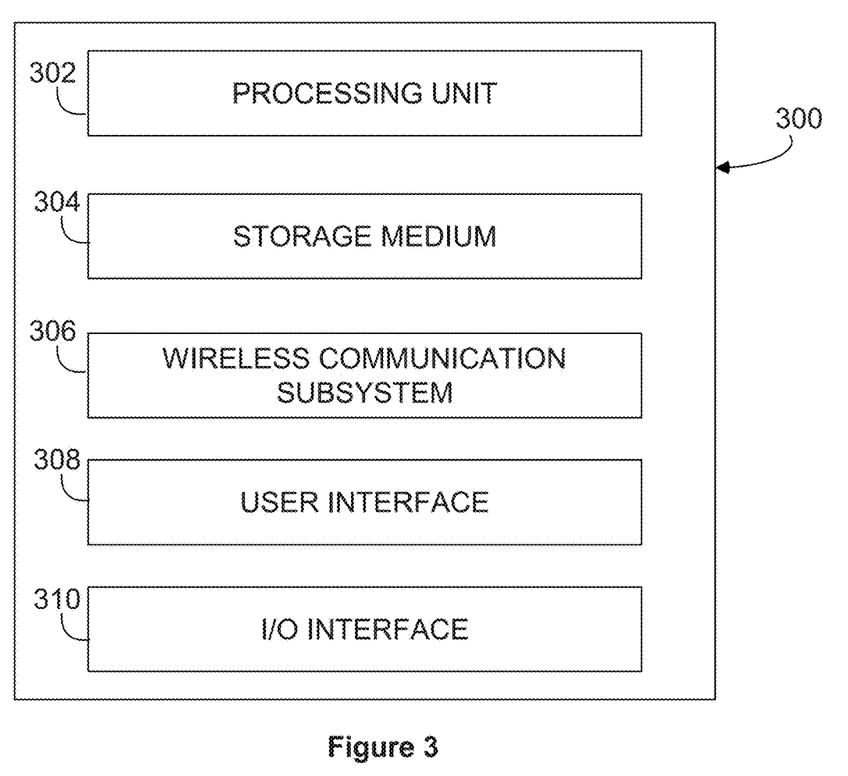
FIG. 3 illustrates an example user equipment device, in accordance with an example of the present disclosure.

FIG. 3 illustrates an example user equipment device 300 consistent with certain aspects of the present disclosure. The example user equipment device 300 includes a processing unit 302, a computer readable storage medium 304 (for example, ROM or flash memory), a wireless communication subsystem 306, a user interface 308, and an I/O interface 310.

The processing unit 302 may include components and perform functionality similar to the processing module 202 described with regard to FIG. 2. The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some implementations, the wireless communication subsystem 306 may receive or transmit information over a direct inter-device communication link. In some implementations, the wireless communication subsystem 306 can support MIMO transmissions.

The user interface 308 can include, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone).

The I/O interface 310 can include, for example, a universal serial bus (USB) interface. One skilled in the art will readily appreciate that various other components can also be included in the example UE device 300.

For UEs to communicate over a direct inter-device communication link, an inter-device communication link is enabled between the UEs. The direct inter-device communication link allows data exchange between the UEs, without routing through the base station and the core network. Descriptions will now be made about methods for UE transmit power adjustment for the inter-device communication in the cellular wireless communication system, according to certain examples of the present disclosure.

The UE may adjust its transmit power for transmissions over the inter-device communication link during a device handshake/discovery procedure and/or during the data transmission. For example, a UE may determine whether to adjust a transmit power level based on a data exchange between the UE and at least one other UE over an inter-device communication link, and adjust the transmit power level based on the determination. The transmit power can be slowly controlled, e.g., in tens of radio frames or can be fast controlled, e.g., in the subframe level. The power control could be eNB based, UE based or both. In one example, eNB could directly control the transmission power based on the feedback information from the UE. In another example, the UE could directly control the transmission power over the D2D link but in this case, the feedback is needed from another UE. ENB and the UE may also be collaborated for the power control. The power control could be single step or multiple step procedure.

LTE uplink and/or downlink radio resources may be used for the data exchange between the UEs over the inter-device communication link. The UE may start transmitting transmission pattern with a transmit power equal to $P_{mn}$ and increase the transmit power by an increment of $\Delta_{TP}$ each time the detection of the predetermined transmission pattern does not meet a required performance target. If the transmit power reaches a maximum transmit power level $P_{mx}$, or the received signal quality meets the required performance target, the UE may determine not to increase the transmit power.

Figure 4:
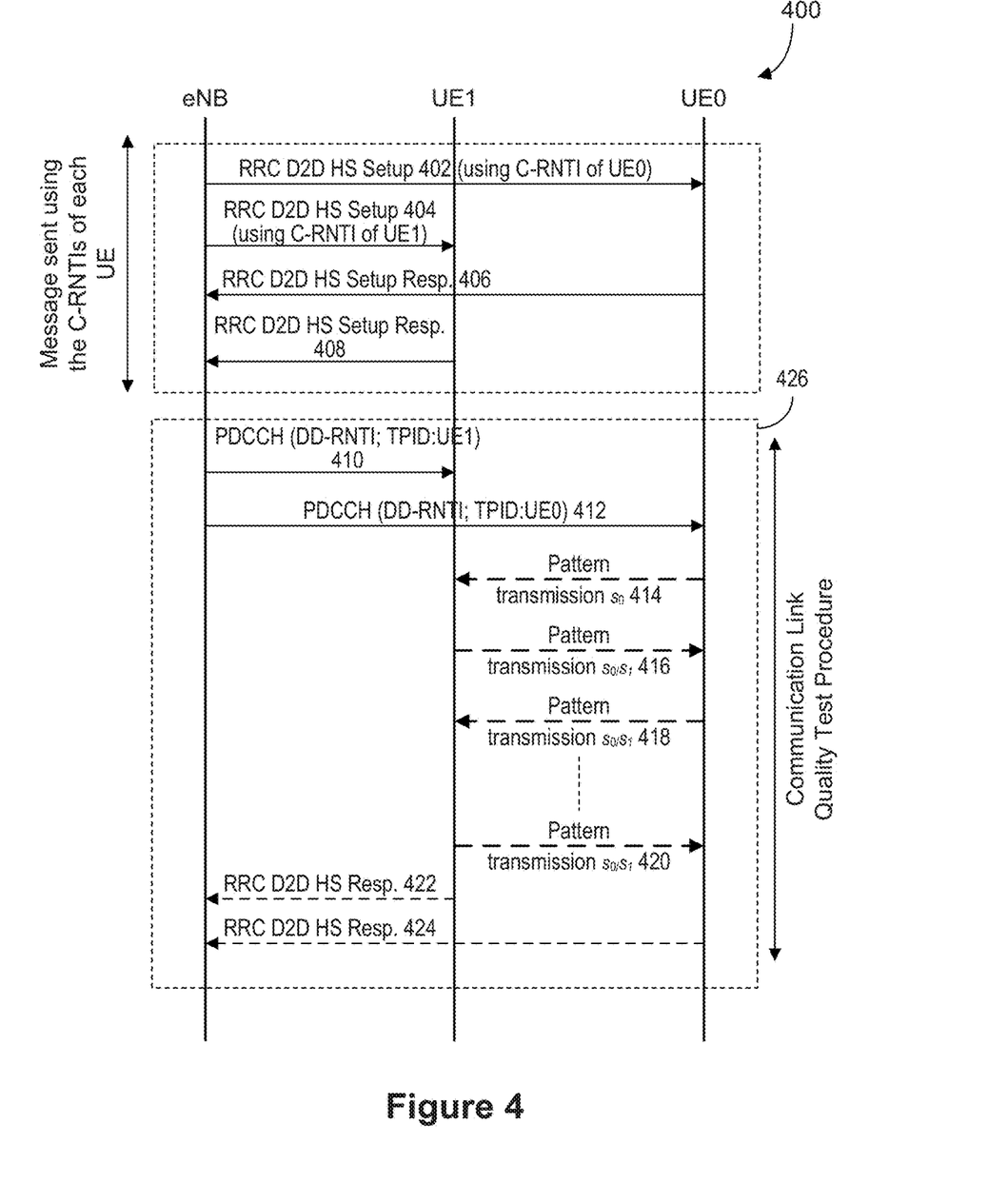
FIG. 4 illustrates a flow diagram of an example method for adjusting a device transmit power for inter-device communication, in accordance with an example of the present disclosure.

FIG. 4 illustrates a flow diagram 400 of an example method for adjusting a device transmit power for inter-device communication, in accordance with an example of the present disclosure. As shown in FIG. 4, the eNB may send respective radio resource control (RRC) D2D handshake (HS) Setup messages to UE0 and UE1 at 402 and 404 to set up a device handshake procedure. Subsequently, UE0 and UE1 may each send a RRC D2D Handshake Setup Response message to the eNB at 406 and 408, respectively, confirming a reception of the RRC D2D Handshake Setup Message. UE0 and UE1 may then start monitoring the messages from the eNB for an initiation of the device handshake procedure. The radio resources for sending these RRC messages may be assigned/granted by the serving eNB via physical downlink shared channel (PDCCH) using the UEs' respective cell radio network temporary identities (C-RNTIs).

Although not shown in FIG. 4, when the eNB determines that a direct communication link between UE0 and UE1 may be enabled, the eNB may send an RRC D2D Connection Setup message to UE0 and/or UE1, prior to the device handshake/discovery procedure. The D2D Connection Setup message may include transmission parameters for the direct communication link, such as a C-RNTI of UE0 or UE1, temporary transmit point identifications for each UE communicating over the inter-device communication link, minimum and/or maximum transmit power levels for transmitting over the inter-device communication link, a device-to-device radio network temporary identity (DD-RNTI) for identifying the direct inter-device link, a transmit power incremental value, $\Delta_{TP}$ for the direct inter-device link, a guard time for the direct inter-device link, etc. The D2D Connection Setup message may also include a set of predefined transmission patterns and a target channel quality indicator (CQI). This message may also include an indication of whether the uplink (UL) radio resources or downlink (DL) radio resources are assigned for the inter-device communication. The D2D Connection Setup message may not consist all the above mentioned parameters. Some of these parameter may be sent in the subsequent RRC D2D HS Setup message. Subsequent to receiving the D2D Connection Setup message from the eNB, UE0 and/or UE1 may send a D2D Connection Setup Response message to the eNB, indicating a successful reception of the D2D Connection Setup message. The device handshake/discovery procedure may subsequently begin.

The RRC D2D HS Setup messages 402 and 404 may contain transmission/reception parameters associated with a device handshake. Device handshake transmission/reception parameters may include: transmission patterns, transmit point IDs, device-to-device radio network temporary identity (DD-RNTI) etc. The transmission patterns may be indicated by an index of a transmission pattern. For example, a set of transmission patterns may be defined, such as in a standards document, with corresponding indices. Alternatively specific parameters which may be used to generate the transmission pattern/sequence may be indicated. This message may also include an indication of whether the uplink (UL) radio resources or downlink (DL) radio resources are assigned for handshake procedure and the subsequent data transmission over the direct inter-device communication link.

The eNB may indicate minimum and maximum transmit power levels $P_{mn}$ and $P_{mx}$ to the UEs as part of the RRC message, for example, in the RRC D2D HS Setup messages 402 and 404, or in an RRC D2D Connection Setup message. The eNB may set the minimum and maximum transmit power levels based, e.g., on the vicinity of the UEs participating in the inter-device communication and the link loss profile in that specific area.

A quality test procedure 426 may then be performed by one or more of UE0, UE1, and the eNB over the direct communication link. The quality test procedure may include a number of message exchanges between UE1 and UE0 over the direct inter-device communication link between UE1 and UE0, e.g., 414-420, to set up an appropriate transmit power level for UE1 and UE0. The eNB may allocate/ grant radio resources for UE1 and UE0 to transmit over the inter-device communication link in PDCCH messages 410 and 412. The Cyclic Redundancy Check (CRC) of these PDCCH messages are scrambled by the DD-RNTI. The radio resources over which a specific UE transmits the transmission patterns are indicated by tagging those resources with the UE's TP ID. The time between recurring resource grants for the same UE are decided by the expected time for UE to detect the transmission pattern and respond. To differentiate from the regular data transmission over the inter-device communication link, the PDCCH message may include a bit to indicate that the handshake transmission pattern will be transmitted over the inter-device communication link.

As illustrated in FIG. 4, to start the power adjustment procedure, UE0 may send a sequence $s_0$ to UE1 over the assigned inter-device link resources at 414. The transmit power level of UE0 $P_{UE0}$ is between the minimum and maximum transmit power levels, i.e., $P_{mn} \leq P_{UE0} \leq P_{mx}$. In one approach, the transmit power is set as $P_{mn}$ or close to $P_{mn}$ at the start of the handshake procedure. UE1 may process the received signal, for example, by cross correlating the received signal with the sequence $s_0$ and comparing the correlation value with a quality indicator.

If the received signal quality at UE1 is acceptable, UE1 may then transmit a sequence $s_1$ at a transmit power level, $P_{UE1}$, $P_{mn} \leq P_{UE1} \leq P_{mx}$, at 416. In one approach, the transmit power is set as $P_{mn}$ or close to $P_{mn}$ at the start of the handshake procedure. Otherwise, UE1 may transmit sequence $s_0$ at the transmit power level $P_{UE1}$ at 416. Correspondingly, if UE0 receives sequence $s_0$ at 416, the transmit power level of UE0 is increased to $P_{UE0}=P_{UE0}+\Delta_{TP}$ for the subsequent transmission at 418 and future transmissions to UE1. $\Delta_{TP}$ represents an incremental value for the transmit power level and may be called a transmit power step. If the received signal quality of $s_0$ is acceptable, UE0 transmits sequence $s_1$ in the next transmission 418 at the increased power level. If the received signal quality of $s_0$ is not acceptable, UE0 transmits sequence $s_0$ in the next transmission 418 at the increased power level.

On the other hand, if UE0 receives sequence $s_1$ at 416, the transmit power level of UE0 may be fixed at $P_{UE0}$ for the subsequent transmission 418 and future transmissions to UE1. If the received signal quality of $s_0$ is acceptable, UE0 transmits sequence $s_1$ in the next transmission 418 at the fixed power level $P_{UE0}$. If the received signal quality of $s_0$ is not acceptable, UE0 transmits sequence $s_0$ in the next transmission 418 at the fixed power level $P_{UE0}$. If neither sequence $s_0$ nor $s_1$ is detected from the received signal, UE0 may indicate to the eNB that the device handshake/discovery procedure is unsuccessful.

UE0 and UE1 may repeat steps 414-418 until an acceptable received signal quality is reached at both UE0 and UE1. At the end of a successful handshake/discovery procedure, UE0 and UE1 may send RRC D2D HS Response messages 422 and 424 to the eNB, including their respective transmit power levels and indicating to the eNB that the device discovery/handshake procedure is successful. A Channel Quality Indicator (CQI) of the direct communication link may also be measured by UE0 and UE1 and reported to the eNB such that the eNB may assign an appropriate modulation and coding scheme (MCS) for future data exchanges over the inter-device communication link. It is to be understood that similar procedures may be applied to a scenario where more than 2 UEs are involved in a group inter-device communication, such as interactive gaming, conference calling, etc. The above described transmit power level optimization can be modified with the introduction of another transmit pattern/sequence $s_2$. This is useful if the UEs are allowed to select any initial transmit power level between $P_{mn}$ and $P_{mx}$. In this case a third transmit pattern may be used to indicate a decrease the transmit power level during the next transmission.

Figure 5:
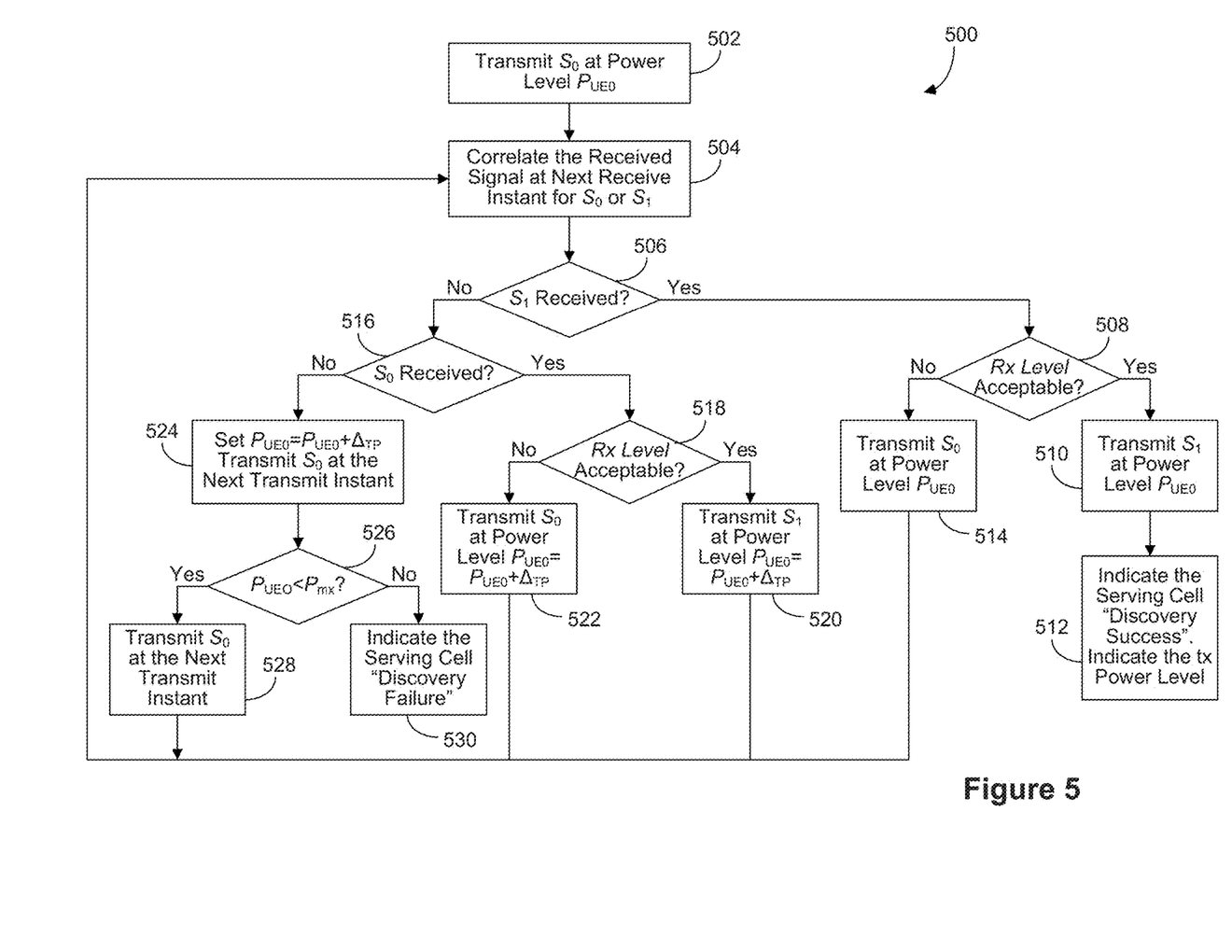
FIG. 5 illustrates a flow chart of an example method for adjusting a device transmit power level for inter-device communication, in accordance with an example of the present disclosure.

FIG. 5 illustrates a flow chart 500 of an example method for adjusting a device transmit power level of UE0 for inter-device communication. As shown in FIG. 5, UE0 may start transmitting sequence $s_0$ at power level $P_{UE0}$ over the inter-device communication link at 502 during the device handshake/discovery procedure. Next, UE0 may receive a transmission from another UE over the inter-device communication link. UE0 then correlates the received signal with $s_0$ or $s_1$ at 504. For example, UE0 may calculate the following metric: $\Gamma_i=|\langle r(k),s^*_i(k)\rangle|^2/|\langle s_i(k),s^*_i(k)\rangle|^2$ for i=0,1, where $\langle x, y\rangle$ indicates the inner product of x and y and |a| indicates the magnitude of a. $r(k)$ and $s_i(k)$ represent the kth element or symbol of the received signal and the ith transmitted pattern or sequence. The superscript '*' represents the complex conjugate operation. Alternatively, the received signal $r(k)$ may be passed through a filter matched to the transmit patterns $s_0$ and $s_1$. UE0 checks whether the received signal is sequence $s_1$ at 506. For example, UE0 may determine that $s_1$ is transmitted if $\Gamma_1 > \Gamma_0$ and $\Gamma_1 > \eta$, where $\eta$ is a measure of the thermal noise power of the UE receiver. $\eta$ may further include other interference power. If sequence $s_1$ is received at 506, UE0 may further check whether the received signal quality is acceptable at 508. This may be done, for example, by checking if $\Gamma_1$ is greater than $\beta$, a CQI threshold as specified by the serving cell. If the received signal quality is acceptable, i.e. $\Gamma_1 > \beta$, UE0 may transmit sequence $s_1$ at power level $P_{UE0}$ over the inter-device communication link at 510. UE0 may also indicate the transmit power level $P_{UE0}$ and a successful device handshake/discovery process to the serving eNB at 512. If the received signal quality is not acceptable, UE0 may transmit sequence $s_0$ at power level $P_{UE0}$ at 514 and return to 504 of the flow chart.

If sequence $s_1$ is not received at 506, UE0 may proceed to check whether sequence $s_0$ is received at 516. For example, UE0 determines that $s_0$ is transmitted if $\Gamma_0 > \Gamma_1$ and $\Gamma_0 > \eta$. If sequence $s_0$ is received, UE0 may further check whether the received signal quality is acceptable at 518. If the received signal quality is acceptable, i.e. $\Gamma_0 > \beta$, UE0 may transmit sequence $s_1$ at an increased power level $P_{UE0} = P_{UE0} + \Delta_{TP}$ over the inter-device communication link at 520. If the received signal quality is not acceptable, UE0 may transmit sequence $s_0$ at the increased power level $P_{UE0} = P_{UE0} + \Delta_{TP}$ at 522 and return to 504 of the flow chart.

If sequence $s_0$ is not received at 516, UE0 may set the transmit power level to $P_{UE0} = P_{UE0} + \Delta_{TP}$ at 524 for the next transmission over the inter-device communication link. For example, UE0 determines that neither $s_0$ or $s_1$ are transmitted if $\Gamma_0 \leq \eta + \epsilon$ and $\Gamma_1 \leq \eta + \epsilon$, where $\epsilon$ is a positive number and specified by the UE receiver. UE0 may further check whether the increased transmit power level $P_{UE0}$ is less than the maximum transmit power level $P_{mx}$ at 526. If the increased transmit power level $P_{UE0}$ is less than the maximum transmit power level, UE0 may transmit sequence $s_0$ at the next transmit instant at 528 and return to 504 of the flow chart. Otherwise, if the increased transmit power level $P_{UE0}$ is not less than the maximum transmit power level, UE0 may indicate a device handshake/discovery failure to the serving eNB at 530. The above described transmit power level optimization can be modified with the introduction of another transmit pattern/sequence $s_2$. This may be useful, e.g., if the UEs are allowed to select any initial transmit power level between $P_{mn}$ and $P_{mx}$. In this case the third transmit pattern $s_2$ is used to indicate a decrease the transmit power level during the next transmission.

Figure 6:
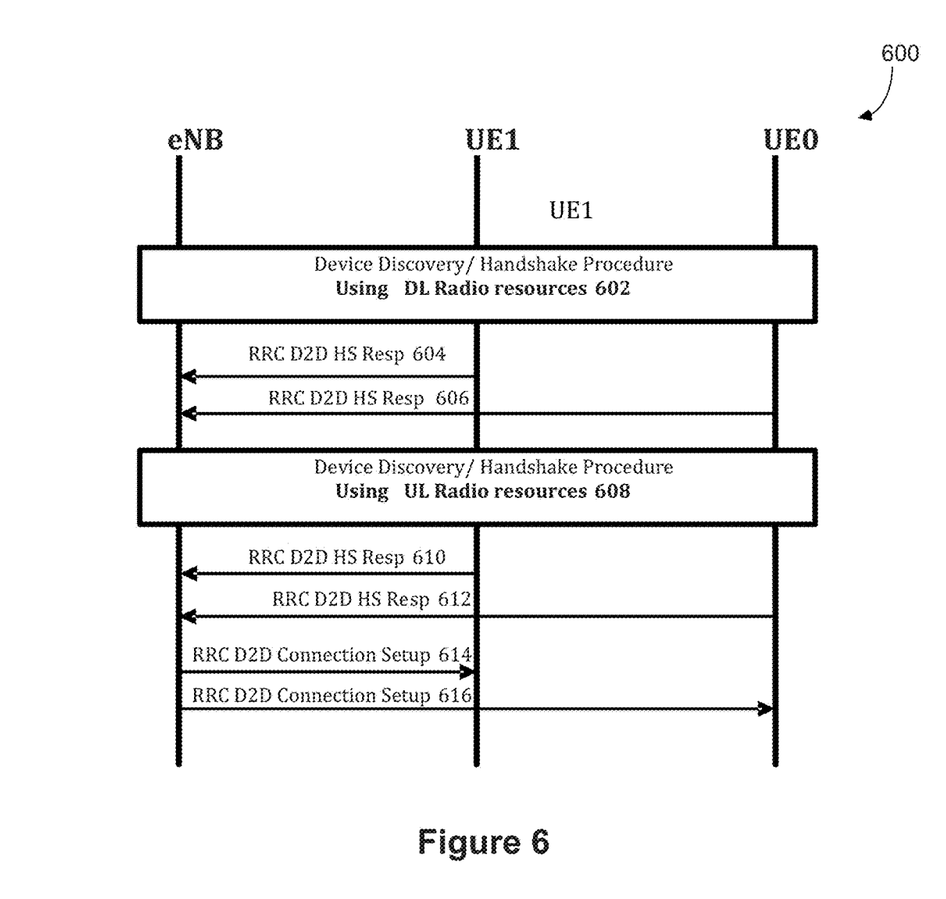
FIG. 6 illustrates a flow diagram of another example method for adjusting a device transmit power for inter-device communication, in accordance with an example of the present disclosure.

FIG. 6 illustrates a flow diagram of another example method for adjusting a device transmit power for inter-device communication. The serving eNB may initiate the D2D Handshake procedure during the direct inter-device call set up or anytime during an ongoing direct communication between the UEs. During the initial call set up the serving eNB may initiate the handshake procedure multiple times to decide the direct inter-device communication link quality. For example the HS procedure may be initiated two times, once using DL radio resources and another time using UL resources. Based on the CQI feedback either UL or DL radio resources are used to enable the direct inter-device communication link. Similarly, specific radio resources over the DL/UL link may be selected based on the CQI feedback. This can be performed by initiating the HS procedure over multiple frequency segments of radio resources. For example HS procedure can be initiated over different set of resource blocks in an LTE system. As illustrated in FIG. 6, at 602, the eNB may initiate HS procedure using the DL radio resources. At 604-606, the UEs, UE0 and UE1 send the CQI based on the received signal from UE1 and UE0 respectively. At 608, the eNB may initiate HS procedure using the UL radio resources. At 610-612, the UEs, UE0 and UE1 send the CQI based on the received signal from UE1 and UE0 respectively. Based on the received CQIs at 604-606 and 610-612, appropriate radio resources are selected for the inter-device communication link and indicated to one or both UEs at 614 in an RRC D2D Connection setup message.

In some implementations, to facilitate the device discovery process, the UE that intends to get involved in the direct-link communication may start periodically broadcast a "beacon" signal to identify itself. The beacon signal could be transmitted over the pre-defined resource or UE specific resource. In one example, if the beacon signal is transmitted over the pre-defined resource, the UE may use orthogonal code sequence for the beacon signal in order to identify itself. In another example, if the beacon signal is transmitted over the UE specific resource, the UE may share the same code sequence. The resource may be directly assigned by the eNB or linked directly with the UE ID. The beacon signal carries at least the UE ID information and is transmitted periodically on pre-determined resources. Other UEs that are capable of conducting inter-device communications may detect the "beacon" signal. The periodic beacon signal may be transmitted/detected only when the UE intends to get involved in the direct-link communication. For example, when UE0 intends to participate in direct-link communication and starts to broadcast a beacon signal, surrounding UEs may detect the beacon signal and consider UE0 as a potential direct-link communication candidate if the beacon signal strength is above a pre-defined threshold value. Then one or more surrounding UEs may initiate a direct-link communication with UE0. The transmit power of this beacon signal may be set by the network such that transmitted beacon signals in a cell do not cause excessive interference within the network. For example, the power level of the beacon signal can be set to be very low, e.g. 10-15 dBm, when the user density within a cell is high.

The systems and methods described above may be implemented by any hardware, software or a combination of hardware and software having the above described functions. The software code, either in its entirety or a part thereof, may be stored in a computer readable memory.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. Method steps may be implemented in an order that differs from that presented herein.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. Although certain illustrated examples in this disclosure may show only two UEs, the described systems and methods for the inter-device communications can be applied to more than two UEs without departing from the scope of the present disclosure.

What is claimed is:

1. A method for wireless communication, comprising:
    receiving an initiation message from a base station for initiating a device handshake procedure, wherein the initiation message from the base station is received using a device-to-device radio network temporary identity (DD-RNTI), and the DD-RNTI identifies an inter-device communication link;
    after receiving the initiation message, transmitting, at a first user equipment (UE), a first sequence to a second UE over the inter-device communication link at a first transmission power level;
    receiving, at the first UE, a response sequence from the second UE over the inter-device communication link;
    determining, at the first UE, that the response sequence comprises a second sequence;
    determining, at the first UE, that the second sequence is different than the first sequence;
    determining, at the first UE, that a received signal quality of response sequence is acceptable;
    in response to determining that the received signal quality of response sequence is acceptable, including the second sequence in a next transmission; and
    in response to the determining that the second sequence is different than the first sequence, using the first transmission power level to transmit the next transmission to the second UE over the inter-device communication link.

2. The method of claim 1, further comprising:
    sending a response message to a base station indicating a completion of a device handshake procedure, in response to receiving the second sequence.

3. The method of claim 1, wherein the first transmission power level is greater than a minimum transmit power level of the first UE.

4. The method of claim 1, wherein the initiation message from the base station includes resource allocation for transmitting the first sequence to the second UE over the inter-device communication link.

5. The method of claim 1, wherein the initiation message from the base station is received using a downlink control information (DCI) format which includes a field indicating that the initiation message is for the inter-device communication link.

6. The method of claim 1, wherein the initiation message from the base station includes a transmit point identification of the first UE.

7. The method of claim 1, further comprising:
    receiving a radio resource control (RRC) inter-device connection setup message from the base station; and
    sending a RRC inter-device connection setup response message to the base station.

8. The method of claim 7, wherein the RRC inter-device connection setup message includes at least one of:
    a cell radio network temporary identity (C-RNTI) of the second UE;
    a temporary transmit point identification of the first UE;
    a minimum and/or maximum transmit power level for the first UE transmitting over the inter-device communication link;
    a device-to-device radio network temporary identity (DD-RNTI);
    a set of predefined sequences;
    a channel quality indicator (CQI) threshold;
    a transmit power incremental value for the first UE; and
    a guard time.

9. The method of claim 1, wherein the second UE receives the initialization message from the base station and detects the first sequence in response to receiving the initialization message.

10. The method of claim 1, wherein the first UE transmits the first sequence using long term evolution (LTE) downlink resources.

11. The method of claim 1, wherein the first UE transmits the first sequence using long term evolution (LTE) uplink resources.

12. A user equipment (UE), comprising:
    one or more processors configured to:
        receive an initiation message from a base station for initiating a device handshake procedure, wherein the initiation message from the base station is received using a device-to-device radio network temporary identity (DD-RNTI), and the DD-RNTI identifies an inter-device communication link;
        transmit a first sequence to a second UE over the inter-device communication link at a first transmission power level;
        receive a response sequence from the second UE over the inter-device communication link;
        determine that the response sequence comprises a second sequence;
        determine that the second sequence is different than the first sequence;
        determine that a received signal quality of response sequence is acceptable;
        in response to determining that the received signal quality of response sequence is acceptable, include the second sequence in a next transmission; and
        in response to the determining that the second sequence is different than the first sequence, use the first transmission power level to transmit the next transmission to the second UE over the inter-device communication link.

13. The user equipment of claim 12, wherein the one or more processors are further configured to:
    send a response message to a base station indicating a completion of a device handshake procedure, in response to receiving the second sequence.

14. The user equipment of claim 12, wherein the first transmission power level is greater than a minimum transmit power level of the UE.

15. The user equipment of claim 12, wherein the initiation message from the base station includes resource allocation for transmitting the first sequence to the second UE over the inter-device communication link.

16. The user equipment of claim 12, wherein the initiation message from the base station is received using a downlink control information (DCI) format which includes a field indicating that the initiation message is for the inter-device communication link.

17. The user equipment of claim 12, wherein the initiation message from the base station includes a transmit point identification of the UE.

18. The user equipment of claim 12, wherein the one or more processors are further configured to:
    receive a radio resource control (RRC) inter-device connection setup message from the base station; and
    send a RRC inter-device connection setup response message to the base station.

19. The user equipment of claim 18, wherein the RRC inter-device connection setup message includes at least one of:

a cell radio network temporary identity (C-RNTI) of the second UE;
a temporary transmit point identification of the UE;
a minimum and/or maximum transmit power level for the UE transmitting over the inter-device communication link;
a device-to-device radio network temporary identity (DD-RNTI);
a set of predefined sequences;
a channel quality indicator (CQI) threshold;
a transmit power incremental value for the UE; and
a guard time.

20. The user equipment of claim 12, wherein the second UE receives the initialization message from the base station and detects the first sequence in response to receiving the initialization message.

21. The user equipment of claim 12, wherein the one or more processors are further configured to transmit the first sequence using long term evolution (LTE) downlink resources.

22. The user equipment of claim 12, wherein the one or more processors are further configured to transmit the first sequence using long term evolution (LTE) uplink resources.

* * * * *